H. ALLEN.
CAR SEAT AND COUCH.
No. 2,692. Reissued July 23, 1867.
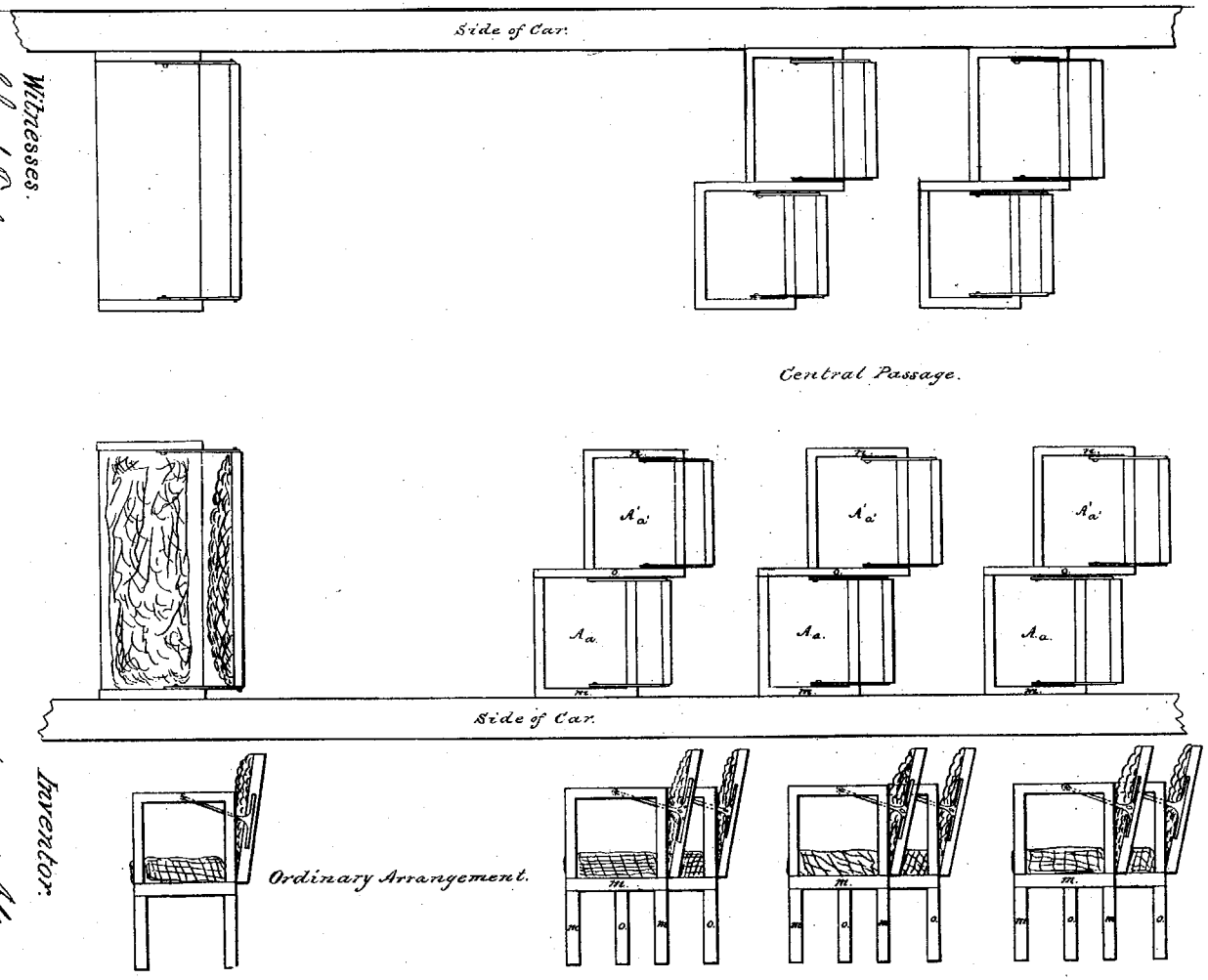
Witnesses.
Chas. A. Taylor.
Fred. W. Child
Inventor.
Morris Allen
THE NORRIS PETERS CO., PHOTO-LITHO., WASHINGTON, D. C.

BEST AVAILABLE COPY

United States Patent Office.

HORATIO ALLEN, OF NEW YORK, N. Y.

*Letters Patent No.* 55,448, *dated June* 12, 1866; *reissue No.* 2,692, *dated July* 23, 1867.

IMPROVEMENT IN CAR-SEATS AND COUCHES.

The Schedule referred to in these Letters Patent and making part of the same.

TO ALL WHOM IT MAY CONCERN:

Be it known that I, HORATIO ALLEN, of the city and State of New York, have invented new and improved Accommodations for Passengers in Railroad Passenger Cars; and I do hereby declare that the following is a full and exact description thereof, reference being had to the accompanying drawings and to the letters of reference marked thereon.

Assuming that the American arrangement of passenger cars, by use of seats in pairs on each side of a central passage, is preferable to any other arrangement, it is believed that improvements thereon can be made which will provide more fully for the comfort and agreeable accommodation of passengers, especially for the long travel which takes place in the United States.

I propose to effect improvements of this character,

First, by providing seats for the passengers, which have the following advantages:

1. Each passenger has a separate seat, and has room for elbows and knees without coming in contact with the elbows and knees of other passengers.

2. No passenger can take possession or part possession of more than one seat.

3. While the seats of each pair of seats are so far separated as to meet the preferences of persons, strangers to each other, they are in such proximity as to be pleasant for two passengers travelling together; but the two seats also admit of being so arranged as to form a sociable, which places the two passengers in the most agreeable relative position that seats can provide.

4. A place and means are provided to receive and hold securely and conveniently a tray from which to take lunch.

5. The central passage is made much more convenient in use; and

Second, by providing at all times, by proper adjustment of parts, accommodations for lying down, affording thereby a place of repose and rest by day and of sleeping by night.

The combinations and devices by which these two classes of advantages are obtained are described herein, and are illustrated by drawings hereto annexed.

1. To obtain the advantages referred to in the first class, I place the pair of seats on each side of the central passage in such a relation to each other and the length of car that a line from centre of one seat to centre of the other seat is diagonal to the length of the car.

Figure 2 represents this combination. A A′, B B′, C C′ are pairs of seats; the lines *a a′*, *b b′*, *c c′* are diagonal to the length of the car, at such angle that the elbows of the two passengers when seated do not come in contact.

In the usual construction of seats in pairs of passenger seats in railroad cars, they are so combined that the two seats are in the same line, and that line is at right angles to the side of the car. On all roads, but especially on the narrow-gauge roads, passengers seated in this combination of seats do not have comfortable and agreeable room; the persons of the two passengers are in too immediate contact, and there is not adequate room for the elbows.

It not being possible on existing roads to make the cars of greater width, this arrangement appears to have been considered a matter of necessity for which there was no remedy. I have invented one by a new combination of the two seats. On trial this combination is found to provide the desired relief.

In the usual combination the two seats are provided in one long seat connected with the floor and side of the car in a position at right angles to the side of the car. Sometimes the two seats thus provided are separated by a support for the arm, which support can only be used by one person at a time. In the combination which I have invented, the seats are combined with the floor and the side of the car by supports which hold one seat in the rear of the other seat, and are connected with an arm-piece between two seats, long enough to furnish support for each of the two elbows.

Figure 1 represents this combination. A A′ are the two seats for one pair. The seat A has its support next the central passage by the leg-frame *m*, and the seat A′ has its support next the side of the car by a leg-frame, *n*, or a piece on the side of car, and the two seats A A′ have their support at the centre by a leg-frame,

105. RAILWAY ROLLING STOCK

Draftman

BEST AVAILABLE COPY

310 o, long enough to receive one seat in the rear of the other. By making the leg-frame in the centre long enough to provide a difference of nine inches, lengthwise the car, the desired relief is obtained. If that difference is made twelve inches, the relief will be obtained in a higher degree. Each seat is provided with a back carried by radius arms in the usual manner, and transferable from one side to the other.

The usual combination may be called the rectangular combination, the line of the two seats being rectangular to the side of the car. The combination which I have invented may be called the diagonal combination, the two seats being in line diagonal to the side of the car.

When one seat is faced in one direction, and the other seat in the other direction, as shown in fig. 1, the pair of seats will be of the combination called a sociable or "tête-à-tête" seat. On the arms, or on one of the arms between the seats, a place is provided to receive and hold by a pin a tray for lunch, &c.

Second. To provide accommodation for lying down, I combine with two seats A A′, having the diagonal position described, four pieces E E′, F F′, of the form represented in fig. 2, which pieces are connected with the frames of the seats or sides of the car by suitable hinges allowing the pieces E E′ to have either a horizontal position, level with the seat, as shown in fig. 2, or to be folded away, as shown in figs. 3 and 5, and the pieces F F′ to have either a horizontal position, as shown in fig. 2, or to stand erect and to support central arm-pieces to the two seats. When the four pieces E E′ F F′ are adjusted to a horizontal position, in combination with the two seats A A′, as shown in fig. 2, a surface of a rhomboid form is obtained, the long side of the rhomboid being diagonal to the length of the car, and the short side parallel to the side of the car; and the long diagonal of the rhomboid is of such length, and the width of the rhomboid on the line *m n* is such, that adequate room for lying down at full length is provided. A suitable mattress being placed on this couch, a place where one of the two passengers can lie down is obtained. When the two pieces F F′, figs. 2, 3, 5, are in a vertical position, a cap-piece, G, fitted on to the two, secures them in position. The forward part of this cap-piece is the support for the arm and elbow of one passenger, and the after part is the support for the arm and elbow of the other passenger. In this arm, cap-piece G is the place to receive the tray or basin. This arm-piece at the centre and the arm-pieces at the ends have the metal plates and sockets H, which receive the pins *p p* of the radius bars of the backs. The radius bars admit of being detached when the backs are to be removed, preparatory to forming a couch of the two seats and the pieces.

The seats thus developed form a couch and provide a lying-down place for one passenger. I make provision for lying-down place for the other of the two passengers by letting down from above a couch-frame of rhomboid form, whose sides are parallel to the sides of the rhomboid couch formed from the seats. This upper couch-frame K may be supported either by suspension, as shown in Figure 3, where the frame is suspended by the cords I I, or the frame may be supported by connection with side of car at one end, and suspended at the other from ceiling, as shown in Figure 4, in which the frame K is connected by a hook, S, to a staple inside of car, and is hung at the other by cord I I, or the end of the frame next central passage may be supported by legs L L, which are hinged to the frame, and rest on and can be secured to the end piece M, as shown in fig. 3, or the end may be supported by pieces N, which are hinged to or connected with the end piece M and secured to the end of the frame when let down, as shown in fig. 4, or the end of the frame may be supported by light posts O O resting on the floor, as shown in fig. 4.

When the couch K is not required, it is secured to the ceiling immediately above its position when in use, and on this frame are placed the mattresses, pillows, &c., required for the two couches.

When the couches are to be used for sleeping-places at night, suitable curtains enclose the space occupied by two passengers, and the space provided between the couches lengthwise the car is used by the passenger in making such preparation for lying down as he chooses to make.

*Claims.*

I claim as my invention, and desire to secure by Letters Patent—

1. The combination with the floor and sides of a railroad passenger car, of couches of a rhomboid form, placed diagonally to the length of the car as herein described, and constructed of two seat pieces A A′, two corner pieces E E′, and two central posts F F′, and supported by frames and legs; said couches being convertible into a pair of seats by putting out of the way the two corner pieces E E′, and securing in a vertical position the two centre pieces F F′ by the cap pieces G, said pair of seats having a relative position diagonal to the length of the car, all substantially in the manner and for the purpose herein described.

2. I claim the combination, with the seat herein described, and uses of a railroad passenger car, of upper couches of rhomboidal form placed diagonally to the length of the car as herein described, and constructed of a frame supported as herein described, all substantially in the manner and for the purpose herein described.

3. I claim as my invention, and desire to secure by Letters Patent, the diagonal combination and construction of the two seats in the pairs of passenger seats in railroad cars, substantially in the manner and for the purpose herein described.

HORATIO ALLEN.

Witnesses:
CHAS. A. TAYLOR,
FRED. W. CHILD.